United States Patent
Constantinou et al.

(10) Patent No.: US 8,857,110 B2
(45) Date of Patent: Oct. 14, 2014

(54) NEGATIVE STIFFNESS DEVICE AND METHOD

(71) Applicants: Michael C. Constantinou, Amherst, NY (US); Andrei M. Reinhorn, Williamsville, NY (US); Apostolos A. Sarlis, Buffalo, NY (US); Douglas Taylor, N. Tonawanda, NY (US); David A. Lee, Santa Monica, CA (US); Satish Nagarajaiah, Sugar Land, TX (US); Dharma Theja R. Pasala, Houston, TX (US)

(72) Inventors: Michael C. Constantinou, Amherst, NY (US); Andrei M. Reinhorn, Williamsville, NY (US); Apostolos A. Sarlis, Buffalo, NY (US); Douglas Taylor, N. Tonawanda, NY (US); David A. Lee, Santa Monica, CA (US); Satish Nagarajaiah, Sugar Land, TX (US); Dharma Theja R. Pasala, Houston, TX (US)

(73) Assignees: The Research Foundation for The State University of New York, Amherst, NY (US); William Marsh Rice University, Houston, TX (US); Taylor Devices, Inc., North Tonawanda, NY (US)

( * ) Notice: Subject to any disclaimer, the term of this patent is extended or adjusted under 35 U.S.C. 154(b) by 0 days.

(21) Appl. No.: 13/673,257

(22) Filed: Nov. 9, 2012

(65) Prior Publication Data

US 2013/0118098 A1 May 16, 2013

Related U.S. Application Data

(60) Provisional application No. 61/558,593, filed on Nov. 11, 2011.

(51) Int. Cl.
*E04H 9/02* (2006.01)
*E04B 1/98* (2006.01)
*F16F 15/00* (2006.01)

(52) U.S. Cl.
CPC .. *E04H 9/02* (2013.01); *E04B 1/98* (2013.01); *F16F 15/00* (2013.01); *E04H 9/021* (2013.01)
USPC ........ 52/167.4; 52/167.2; 52/167.3; 52/653.1

(58) Field of Classification Search
CPC ........... E04H 9/02; E04H 9/021; E04H 9/024; E04H 2009/026; E04B 1/98; E04B 1/985
USPC ............... 52/167.1, 167.3, 167.4, 167.8, 295, 52/653.1, 741.3
See application file for complete search history.

(56) References Cited

U.S. PATENT DOCUMENTS 1,158,932 A * 11/1915 Kohl ............................ 52/167.6

(Continued)

FOREIGN PATENT DOCUMENTS

JP 10008769 1/1998

(Continued)

OTHER PUBLICATIONS

Lee, C.-M., Design of Springs with "Negative" Stiffness to Improve Vehicle Driver Vibration Isolation, Journal of Sound and Vibration, 865-874, vol. 302 (2007).

(Continued)

*Primary Examiner* — William Gilbert
*Assistant Examiner* — James Ference
(74) *Attorney, Agent, or Firm* — Hodgson Russ LLP

(57) ABSTRACT

A negative stiffness device and method for seismic protection of a structure is described. In one embodiment, the device has an anchor frame and a movement frame laterally translatable relative to the anchor frame. The anchor frame and movement frame have respective extension portions. A linkage is pivotably connected to the extension portion of the anchor frame. A compressed spring has a first end is attached to the extension portion of the movement frame and a second end attached to the linkage. The compressed spring has a spring force. In a rest state, the compressed spring does not apply a lateral force to the movement frame. In an engaged state, the compressed spring is configured to apply a lateral force to displace the movement frame in a lateral direction of a seismic load. The spring force is amplified by the linkage when the movement frame is laterally displaced to an amplification point.

20 Claims, 7 Drawing Sheets

(56) References Cited

U.S. PATENT DOCUMENTS

| | | | |
|---|---|---|---|
| 2,035,009 A * | 3/1936 | Rager | 52/167.4 |
| 2,055,000 A * | 9/1936 | Bacigalupo | 52/167.6 |
| 3,771,270 A * | 11/1973 | Byers | 52/167.6 |
| 4,402,483 A * | 9/1983 | Kurabayashi et al. | 248/636 |
| 4,527,365 A * | 7/1985 | Yoshizawa et al. | 52/167.8 |
| 4,565,039 A * | 1/1986 | Oguro et al. | 52/167.4 |
| 4,586,361 A * | 5/1986 | Reinhorn et al. | 72/389.5 |
| 4,596,373 A * | 6/1986 | Omi et al. | 248/562 |
| 4,651,481 A * | 3/1987 | Csak | 52/167.8 |
| 4,799,339 A * | 1/1989 | Kobori et al. | 52/741.1 |
| 4,890,430 A * | 1/1990 | Kobori et al. | 52/167.3 |
| 4,922,667 A * | 5/1990 | Kobori et al. | 52/167.2 |
| 5,005,326 A * | 4/1991 | Ishimaru et al. | 52/167.2 |
| 5,025,599 A * | 6/1991 | Ishii et al. | 52/167.2 |
| 5,025,600 A * | 6/1991 | Sugimoto et al. | 52/167.1 |
| 5,036,633 A * | 8/1991 | Kobori et al. | 52/1 |
| 5,347,772 A * | 9/1994 | Ishimaru et al. | 52/167.1 |
| 5,386,671 A * | 2/1995 | Hu et al. | 52/167.3 |
| 5,456,047 A * | 10/1995 | Dorka | 52/167.4 |
| 5,462,141 A * | 10/1995 | Taylor | 188/280 |
| 5,560,162 A * | 10/1996 | Kemeny | 52/167.3 |
| 5,660,007 A * | 8/1997 | Hu et al. | 52/167.3 |
| 5,669,594 A * | 9/1997 | Platus et al. | 248/619 |
| 5,765,313 A * | 6/1998 | Lee et al. | 52/1 |
| 5,819,484 A * | 10/1998 | Kar | 52/167.3 |
| 5,845,438 A * | 12/1998 | Haskell | 52/167.1 |
| 5,915,676 A * | 6/1999 | Abiru et al. | 267/136 |
| 5,979,126 A * | 11/1999 | Kurino et al. | 52/167.2 |
| 6,098,969 A * | 8/2000 | Nagarajaiah | 267/136 |
| 6,233,884 B1 * | 5/2001 | Tipping et al. | 52/167.1 |
| 6,247,275 B1 * | 6/2001 | Taylor | 52/167.3 |
| 6,405,493 B1 * | 6/2002 | Taylor | 52/167.3 |
| 6,530,182 B2 * | 3/2003 | Fanucci et al. | 52/167.3 |
| 6,672,573 B2 * | 1/2004 | Berton | 267/136 |
| 6,676,101 B2 * | 1/2004 | Platus | 248/603 |
| 6,971,795 B2 * | 12/2005 | Lee et al. | 384/36 |
| 7,441,376 B2 * | 10/2008 | Ishimaru et al. | 52/167.6 |
| 7,774,996 B2 * | 8/2010 | Mualla | 52/167.4 |
| 8,117,788 B1 * | 2/2012 | Mueller et al. | 52/167.3 |
| 2002/0129568 A1 * | 9/2002 | Oka | 52/167.3 |
| 2003/0099413 A1 * | 5/2003 | Lee et al. | 384/36 |
| 2003/0205008 A1 * | 11/2003 | Sridhara | 52/167.3 |
| 2003/0223659 A1 * | 12/2003 | Lee et al. | 384/36 |
| 2004/0074161 A1 * | 4/2004 | Kasai et al. | 52/167.1 |
| 2004/0107654 A1 * | 6/2004 | Powell et al. | 52/167.3 |
| 2005/0115170 A1 * | 6/2005 | Mualla | 52/167.1 |
| 2006/0037257 A1 * | 2/2006 | Newland et al. | 52/167.3 |
| 2006/0179729 A1 * | 8/2006 | Li | 52/167.7 |
| 2008/0098670 A1 * | 5/2008 | Hsu | 52/167.1 |
| 2008/0250746 A1 * | 10/2008 | Nawrotski | 52/653.1 |
| 2009/0013619 A1 * | 1/2009 | Marroquin | 52/167.6 |
| 2010/0043317 A1 * | 2/2010 | Mualla | 52/167.1 |
| 2011/0239551 A1 * | 10/2011 | Goto et al. | 52/167.3 |
| 2012/0038091 A1 * | 2/2012 | Tagawa | 267/136 |
| 2012/0047822 A1 * | 3/2012 | Zeevi | 52/167.4 |
| 2012/0159876 A1 * | 6/2012 | Loewen et al. | 52/167.6 |
| 2012/0167490 A1 * | 7/2012 | Balducci | 52/167.3 |
| 2012/0174500 A1 * | 7/2012 | Yakoub | 52/167.4 |
| 2012/0260586 A1 * | 10/2012 | Thubota | 52/167.6 |

FOREIGN PATENT DOCUMENTS

| | | | |
|---|---|---|---|
| JP | 10238164 | 9/1998 | |
| JP | 11351315 | 12/1999 | |
| JP | 2000055117 | 2/2000 | |
| JP | 2000304090 | 10/2000 | |
| JP | 2002286088 | 10/2002 | |
| JP | 2003049557 | 2/2003 | |
| JP | 2003278827 | 10/2003 | |
| JP | 2005030573 | 2/2005 | |
| WO | WO 2011029749 A1 * | 3/2011 | E04H 9/02 |

OTHER PUBLICATIONS

Molyneux, W.G., Supports for Vibration Isolation, Ministry of Supply, Aeronautical Research Council Current Papers, CP No. 322 (1956).

* cited by examiner

NEGATIVE STIFFNESS DEVICE AND METHOD

CROSS-REFERENCE TO RELATED APPLICATION

This application claims the benefit of priority to U.S. provisional patent application Ser. No. 61/558,593 filed Nov. 11, 2011, the disclosure of which is incorporated herein by reference in its entirety.

FIELD OF THE INVENTION

The invention relates to apparatuses for isolating large structures and structural members from seismic forces.

BACKGROUND OF THE INVENTION

Systems and devices for improving structural response to earthquakes are based on the principle of seismic isolation, in which energy is generally dissipated by mechanical dissipating devices. In order to prevent damage to maintain structural components, large horizontal displacements must be accommodated. For example, passive systems have been used for this purpose, including devices having lead cores within lead-rubber bearings, frictional sliding bearings, and other supplemental mechanical energy-dissipating devices such as steel, viscous, or visco-elastic dampers.

The use of active-control structures that attenuate excessive structural movement by hydraulic actuators are also known. The force exerted by the actuator is calculated in real-time using a control algorithm and feedback from sensors. Although this approach has shown to be effective, its applications are limited due to its high-power and continuous feedback signal requirements. Consequently, a considerable amount of recent research has focused on the use semi-active control strategies, which combine features of both passive and active control systems.

A vibration isolation concept, which relies on a spring arrangement with a non-linear stiffness that provides zero, or very small stiffness for a limited range of movement is known in the art. A "true" negative stiffness means that a force is introduced to assist motion, not oppose it. Negative stiffness devices have been applied to the development of vibration isolation systems for small, highly sensitive equipment (e.g., U.S. Pat. No. 6,676,101) and to seats in automobiles (Lee, C. M., Goverdovskiy, V. N. and Temnikov, A. I., "Design of springs with negative stiffness to improved vehicle driver vibration isolation", Journal of Sound and Vibration, 302 (4), p. 865-874 (2007)). To date, however, this technology has been restricted to small mass applications because of the requirement for large forces to develop the necessary low or negative stiffness. The preload forces necessary to achieve negative stiffness are typically of the order of the weight being isolated. Thus, the application of negative-stiffness to a massive structure, like buildings and bridges, would require a spring force on the order of the weight of the massive structure. Such large spring forces would provide forces that would be physically very difficult and economically prohibitive to contain.

Negative stiffness concepts have been applied to isolating structures, but the concepts advanced have drawbacks. One concept advanced is a pseudo negative stiffness system where active or semi-active hydraulic devices are used to produce negative stiffness. However, such systems are complicated, and require high-power and continuous feedback in order to drive the active or semi-active hydraulic devices. Another example is a system in which a structure is placed on top of convex pendulum bearings. In this system, negative stiffness is generated due to the structure's vertical loads applied on the convex surface while elastomeric bearings placed in parallel provide positive stiffness. However, this system generates low effective stiffness that emulates the behavior of friction pendulum bearings. Complications of this system may arise due to the fact that the vertical loads are transferred through an unstable system, which generates constant negative stiffness for all displacement amplitudes.

BRIEF SUMMARY OF THE INVENTION

The present invention can be embodied as a system, device, or method, which introduces negative stiffness to cooperate with motion, for example, motion caused by seismic activity, rather than to oppose such motion. The present invention can be a passive mechanical system that generates negative stiffness, meaning that it does not require external power supply. Because the preload forces for applying the principle of negative stiffness to a massive structure, such as a building or bridge, would require preload forces that are typically of the order of the weight of the structure, the present invention can be configured to significantly reduce the demand for preload spring force, and can "package" the negative stiffness in a device that does not impose additional loads on the structure (other than those loads needed for achieving the goal of seismic protection).

In one embodiment, a negative stiffness device for seismic protection of a structure has an anchor frame and a movement frame laterally translatable relative to the anchor frame. The anchor frame and movement frame have respective extension portions. A linkage is pivotably connected to the extension portion of the anchor frame. A compressed spring has a first end attached to the extension portion of the movement frame and a second end attached to the linkage. The compressed spring has a spring force. In a rest state, the compressed spring does not apply a lateral force to the movement frame. In an engaged state, the compressed spring is configured to apply a lateral force to displace the movement frame in a lateral direction of a seismic load. The spring force is amplified by the linkage when the movement frame is laterally displaced to an amplification point.

In another embodiment, a method of protecting a structure from seismic activity includes providing at least one negative stiffness device. The negative stiffness device has an anchor frame and a movement frame. The movement frame is laterally translatable relative to the anchor frame. The anchor frame has an extension portion extending in the direction of the movement frame, and the movement frame has an extension portion extending in the direction of the anchor frame. The negatives stiffness device also includes a linkage pivotably connected to the extension portion of the anchor frame and a compressed spring having a first end attached to the extension portion of the movement frame and a second end attached to the linkage. The compressed spring has a spring force. The at least one negative stiffness device is configured to have a rest state where the compressed spring does not apply a lateral force to the movement frame and configured to have an engaged state where the compressed spring applies a lateral force to the movement frame such that the movement frame is displaced in a lateral direction of a seismic load. The linkage is configured to amplify the spring force when the movement frame is laterally displaced to an amplification point. The at least one negative stiffness device is installed at the base of a multi-story structure.

DESCRIPTION OF THE DRAWINGS

For a fuller understanding of the nature and objects of the invention, reference should be made to the following detailed description taken in conjunction with the accompanying drawings, in which.

DETAILED DESCRIPTION OF THE INVENTION

Figure 1:
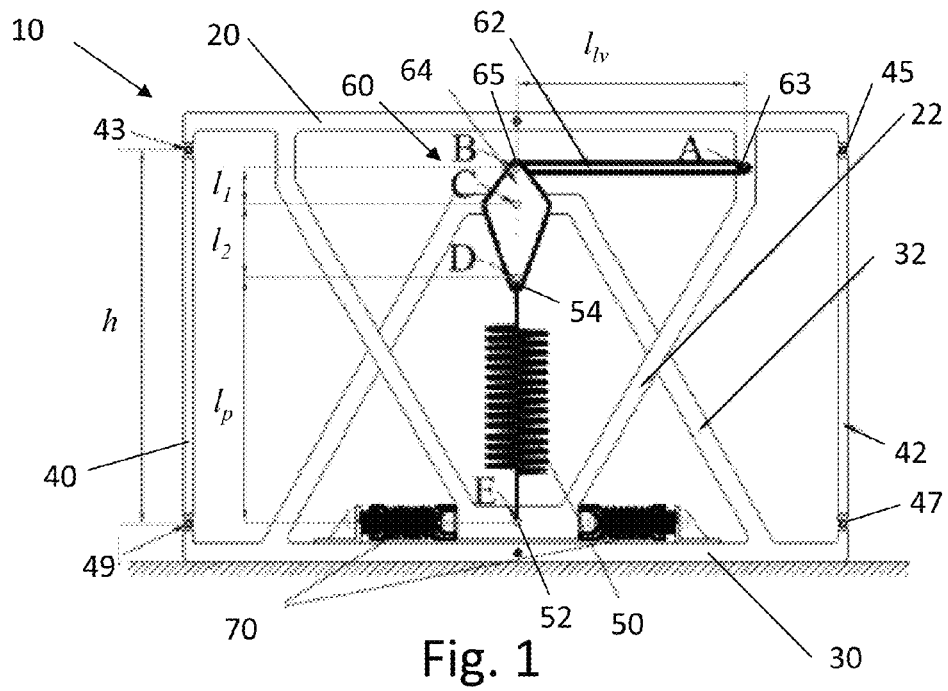
FIG. 1 is a diagram of a negative stiffness device in a rest state according to an embodiment of the present invention.
Figure 2:
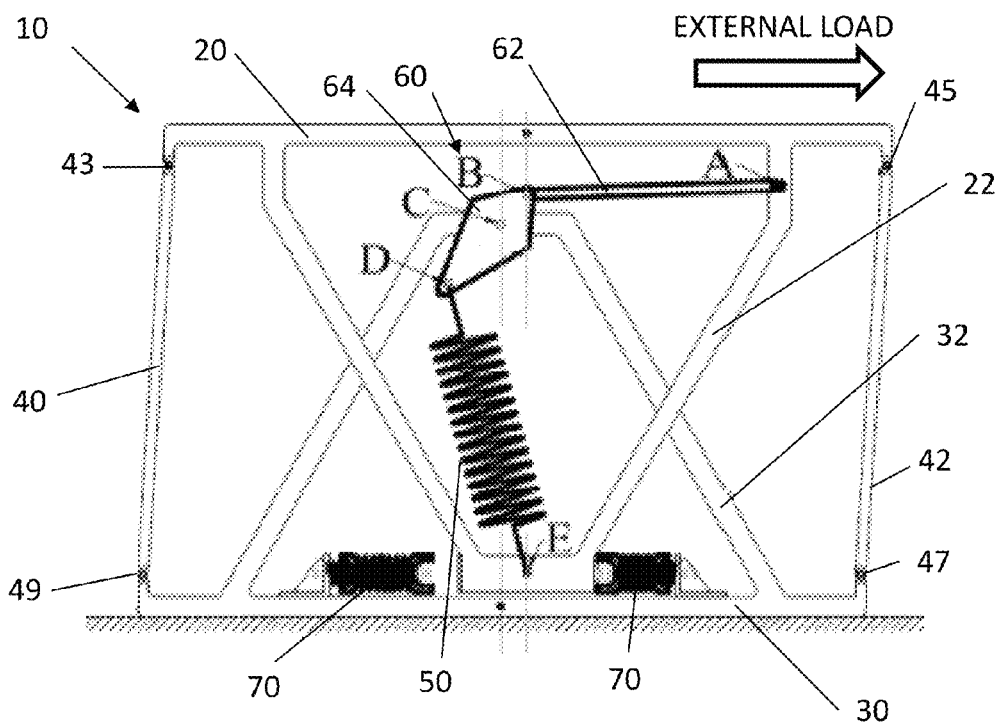
FIG. 2 is a diagram of the negative stiffness device of FIG. 1 in an engaged state.

A schematic of a device 10 according to an embodiment of the present invention is shown in FIG. 1, in a rest state, and shown in FIG. 2, in an engaged state. As shown in FIGS. 1 and 2, the device 10 includes a movement frame 20 and an anchor frame 30. The movement frame 20 has an extension portion 22, which extends in the direction of the anchor frame 30. The anchor frame 30 has an extension portion 32, which extends in the direction of the movement frame 20. In the embodiment shown in FIGS. 1 and 2, the extension portions 22, 32 are chevron braces, but other brace configurations could alternatively be used. Connecting members 40, 42 pivotably connect the anchor frame 30 to the movement frame 20, for example, via hinges 43, 45, 47, 49, such that movement frame 20 is laterally translatable relative to the anchor frame 30. The connecting members 40, 42 can limit the maximum vertical distance h between the movement frame 20 and the anchor frame 30. The embodiment shown in FIGS. 1 and 2, demonstrates how the device 10 may be modular (e.g., installed into a structure as a self-contained system). However, it is also within the scope of the present disclosure to configure a structure, itself, to have the features of the present invention.

A spring 50 may be in a compressed state and attached at a first end 52 to the extension portion 22 of the movement frame 20 and attached at a second end 54 to a linkage 60. The compressed spring 50 may be a pre-loaded machine spring, such as those marketed by Taylor Devices, Inc., where the spring is machined from a solid block of steel having rectangular coil or tangential beam spring elements, but other springs known in the art may be used, including metallic springs of coiled wire, stacked Belleville washers, single and multiple leaf springs, or pressurized gas springs or compressible fluid springs. Additionally, the compressed spring 50 can comprise a plurality of individual compressed springs.

The linkage 60 can comprise a lever member 62 and a pivot member 64. The lever member 62 can be pivotably connected to the extension portion 22 of the movement frame 20 at a first end 63 and pivotably connected to the pivot member 64 at a second end 65. The pivot member 64 can be pivotably connected to the extension portion 32 of the anchor frame 30.

In the engaged state, shown in FIG. 2, the movement frame 20 is translated relative to the anchor frame 30, thereby causing the linkage 60 to transfer the spring force created by the compression of the spring 50 and impart a lateral force to the movement frame 20 and urging further displacement. In FIG. 2, the location (A) at which lever member 62 is affixed to the extension portion 22 of the movement frame 22, is displaced in the right lateral direction relative to its initial position in the rest state. The lever member 62 is displaced, which causes pivot member 64 to rotate about its pivotable connection with extension portion 32 of anchor member 30 (at point C). Due to the axial rigidity of the lever and its negligible rigid body rotation, the imposed displacement at point A and the displacement of point B (where lever member 62 is connected to pivot member 64) are equal or substantially equal. Point D, where compressed spring 50 and pivot member 64 are attached, moves in the lateral direction opposite to that of point A. Point E, where compressed spring 50 is pivotably attached to extension member 22, is rigidly connected to the movement frame 20, and therefore has a displacement equal to that of point A. Due to the kinematics of points D and E, the compressed spring 50 rotates and its spring force urges further displacement of the movement frame rather than opposing it. Point D moves in an opposite lateral direction from that of an external load (e.g. seismic). The motion of point D relative to point E is magnified by comparison to the motion of point A: (a) by leverage produced by lever member 62 and pivot member 64, particularly the ratio of the distance DC ($l_1$) to CB ($l_2$); and (b) by the addition of lateral movement of point E by the same amount of lateral movement as point A.

In some configurations, the lateral force can be about 20 to 100 times larger than the spring force at peak amplification. In the embodiment shown in FIGS. 1 and 2, the compressed spring 50 is at its minimum length (lp) when the device is in its rest state (FIG. 1). In the engaged state, the device 10 deforms from the rest state, the compressed spring 50 extends, its pre-compression force reduces, its angle of inclination increases, and as the displacement of the movement frame 20 occurs, the negative stiffness magnitude generated by the device 10 reduces.

A gap spring assembly 70 can be used to delay engagement of the compressed spring 50 until the displacement of the movement frame 20 exceeds a predetermined magnitude. For example, the gap spring assembly 70 can include a pair of opposing springs, each opposing spring being laterally disposed between the extension portion 22 of the movement frame and the anchor frame 30. The gap spring assembly 70 can provide a positive stiffness up to a predetermined displacement, such that the combined effective stiffness of the compressed spring 50 and the gap spring assembly 70 is zero or almost zero until the predetermined displacement of movement frame 20 is reached. The gap spring assembly 70 can be used to simulate bi-linear elastic behavior with an apparent-yield displacement that is smaller than the actual yield displacement of a structure that the device 10 is attached to. In this manner, the device 10 can avoid an excessive response for a relatively small external load (e.g., small seismic load, load caused by wind, etc.)

In use, the negative stiffness device 10 may be attached to a structure having large weight, such as a multi-story building. The device 10 begins at a rest state (FIG. 1), and is placed in an engaged state when the movement frame 20 is displaced to a predetermined point. For example, the movement frame 20 may be displaced by an external excitation. Although the present description generally describes an external excitation as a seismic load, the present invention is not limited to this example. Additional examples of external excitations can include wind force, blast, and other forms of vibration. It should also be understood that describing external loads on, and movement of the movement frame is done for convenience—seismic loading may be represented by movement of the foundation of a structure to which the anchor frame is connected. The relevant motion is the relative motion between the movement frame 20 and anchor frame 30. It should be understood that the negative stiffness device 10 may be attached at any two levels of a structure of which one, but not necessarily, may be the foundation of the structure.

When the device 10 is in an engaged state, the compressed spring 50 provides negative stiffness control forces that can reduce the natural frequency of the structural system by reducing its apparent stiffness and strength. When the movement frame 20 is laterally displaced to an amplification point, the spring force of the compressed spring 50 is amplified by the linkage 60. In some embodiments, the spring force is amplified by any lateral displacement of the movement frame 20. In other embodiments, the amplification point occurs after a predetermined displacement, for example, if a gap spring assembly 70 is used. It should be noted that the amplification point does not have to be a single displacement point, but can also be a range of lateral displacement of the movement frame 20.

Figure 3A:
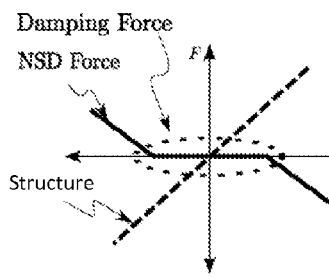
FIG. 3A is a force-displacement graph showing component forces of an exemplary system according to the present invention.
Figure 3B:
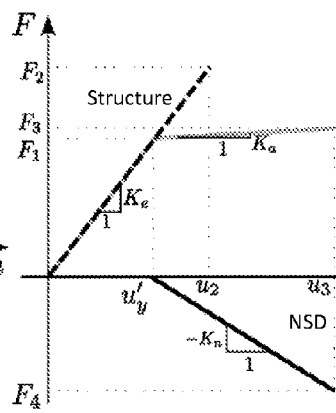
FIG. 3B is a force-displacement graph showing an assembly of the system of FIG. 3A without dampening.
Figure 3C:
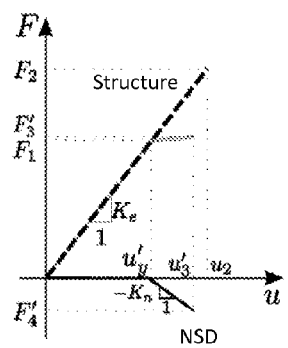
FIG. 3C is a force-displacement graph showing an assembly of the system of FIG. 3A with dampening.

FIG. 3A is a force-displacement graph that plots the component forces of an elastic spring representing a structure, a negative stiffness device added to the structure, and the damping force of a damper added to the structure. As shown in FIG. 3B, the negative stiffness device is activated at a prescribed apparent yield displacement $u'_y$. By introducing the negative stiffness $K_n$, the combined stiffness of the structure and the negative stiffness device reduces from an initial value $K_e$, at displacements from 0 to $u'_y$, and to $K_e-K_n$ beyond the displacement $U'_y$ (FIG. 3B). If, $F_2$ and $u_2$ are the maximum force and maximum displacement, respectively, of a structure without the negative stiffness device, then the maximum force and maximum displacement, respectively, of the structure with the negative stiffness device are $F_3$ and $u_3$, respectively, where force $F_3$ is much less than force $F_2$ (FIG. 3B). The value of negative stiffness $K_n$ can be therefore selected to achieve the desired reduction in base shear force F. However, the maximum deformation of the structure and the assembly is expected to increase as a result of reduction of the stiffness of the assembly. FIG. 3C shows the effect of adding dampers to the assembly, which results in reduction of displacement from value $u_3$ in FIG. 3B to the much smaller value $u_3'$ in FIG. 3C and, consequently, reduction in deformation to the structure and assembly. An example of a suitable damper for the present invention is a passive viscous damper with a 20 percent damping ratio, such as those commercially marketed by Taylor Devices, Inc. as self-contained Fluid Viscous Dampers for Seismic and Wind load Protection of Structures, commonly used in force capacities ranging from 50,000 lbs to 2,000,000 lbs output force.

Figure 4A:
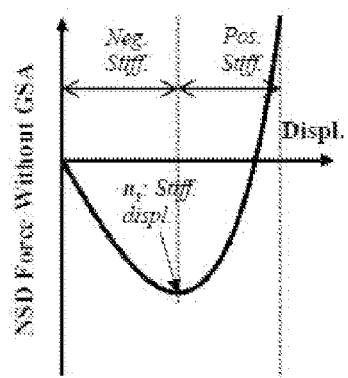
FIG. 4A is a force-displacement graph of an exemplary negative stiffness device without a gap spring assembly in accordance with the present invention.
Figure 4B:
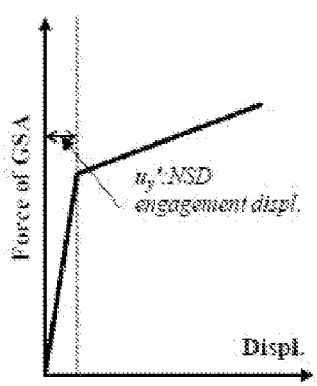
FIG. 4B is a force-displacement graph of an exemplary gap spring assembly in accordance with the present invention.
Figure 4C:
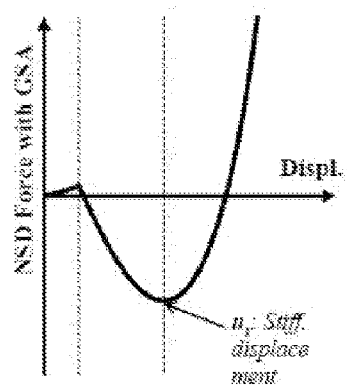
FIG. 4C is a force-displacement graph of an exemplary negative stiffness device with a gap spring assembly in accordance with the present invention.

FIG. 4A is a force-displacement graph of an exemplary negative stiffness device without a gap spring assembly in accordance with the present invention. FIG. 4B is a force-displacement graph of an exemplary gap spring assembly in accordance with the present invention. The addition of the gap spring assembly of FIG. 4B to the negative stiffness device of FIG. 4A results in the relation shown in FIG. 4C. In the resulting combined system, net stiffness is approximately at zero or just above zero until the apparent-yield displacement point $u'_y$ is reached (the displacement beyond which the negative stiffness device is engaged). That is, the gap spring assembly can be designed to generate a positive stiffness equal to, or slightly larger than the negative stiffness, when there is zero displacement so that the overall stiffness generated by the device for displacements less than $u'_y$ is approximately zero or slightly larger than zero as shown in FIG. 4C. It should be noted that the vertical component of the spring force provided by the compressed spring 50 substantially offset by a counter-directional force provided by the connecting members 40, 42 (ignoring any slight vertical displacement of the movement frame 20 caused by the connecting members). In this manner, when the device 10 is attached to a structure, it does not impose a vertical load on the structure. It is contemplated, however, that the present invention could be configured, if desired, to impart some degree of vertical load to a structure.

FIG. 4A also shows that the negative stiffness force produced by the device 10 initially increases as displacement occurs. The negative stiffness of the device 10 then decreases until device 10 produces a positive stiffness when the spring 50 is stretched beyond a null point $u_5$ at larger displacements. This "stiffening" effect can be desirable. For example, the device 10 can act as a displacement restrainer in the event of seismic load that is beyond a predetermined maximum, thus preventing excessive displacement and collapse of the structure.

Figure 5A:
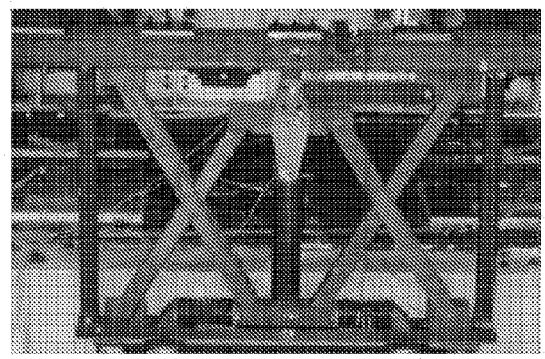
FIG. 5A shows a negative stiffness device according to an embodiment of the present invention in a rest state.
Figure 5B:
FIG. 5B shows the device shown in FIG. 5A in an engaged state.
Figure 6A:
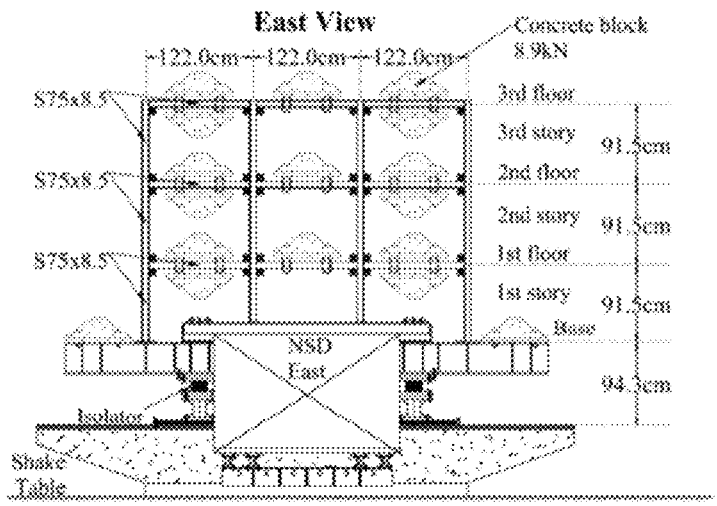
FIG. 6A is an elevational view of negative stiffness devices attached to a structure in accordance with an embodiment of the present invention.
Figure 6B:
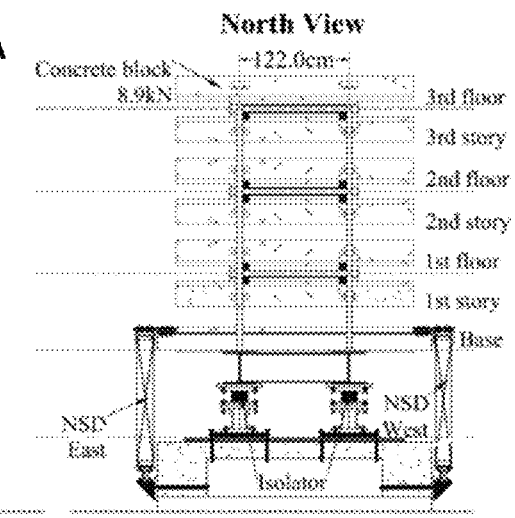
FIG. 6B is a side view of the negative stiffness devices and structure of FIG. 6A.

FIGS. 5A and 5B are photographs of a prototype of an exemplary negative stiffness device 90 built according to an embodiment of the present invention in a rest state (FIG. 5A) and an engaged state (FIG. 5B). The device 90 was installed on a model structure and tested at the University at Buffalo with a shake table, which simulates shaking ground during an earthquake. As shown in FIGS. 6A and 6B, two negative stiffness devices 10 were attached to a three story structure that is supported by an elastomeric isolation system. Tests were conducted with and without added viscous dampers in the isolation system. The model structure was subjected to simulated earthquakes, shown in Table 1 (below). The simulated earthquakes were modeled after historical earthquake motions recorded in the United States and abroad.

TABLE 1

Earthquake Motions Used in Testing

| Earthquake/Year | Notation | Magnitude | Peak Ground Acceleration (g) |
|---|---|---|---|
| San Fernando, California, 1971 | PUL-254 | 6.6 | 1.16 |
| Northridge, California, 1994 | NWH-090 | 6.7 | 0.70 |
| Northridge, California, 1994 | 637-270 | 6.7 | 0.80 |
| Kobe, Japan, 1995 | KJM-090 | 6.9 | 0.71 |
| Chi-Chi, Taiwan, 1999 | TCU-129-E | 7.6 | 0.79 |
| Loma Prieta, California, 1989 | CAP-000 | 6.9 | 0.48 |
| Denali, Alaska, 2002 | PS-10317 | 7.9 | 0.32 |
| Kocaeli, Turkey, 1999 | DZC-270 | 7.5 | 0.33 |

Figure 7A:
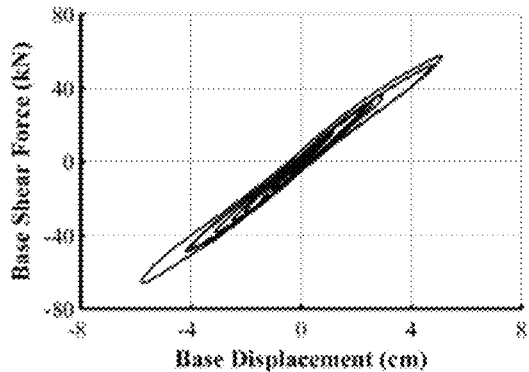
FIG. 7A is a force-displacement graph showing recorded force-displacement loops of an exemplary isolation system without a negative stiffness device.
Figure 7B:
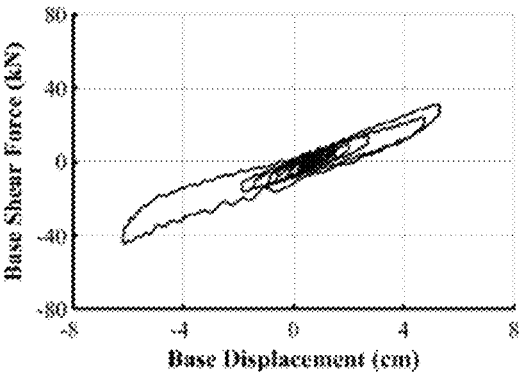
FIG. 7B is a force-displacement graph showing recorded force-displacement loops of an exemplary isolation system with a negative stiffness device in accordance to an embodiment of the present invention.

FIGS. 7A and 7B are graphs showing recorded force-displacement loops of the isolation system without (FIG. 7A) and with (FIG. 7B) the negative stiffness devices 90. It can be seen that the reduction in stiffness by the addition of the tested negative stiffness devices 90 is significant.

Figure 8:
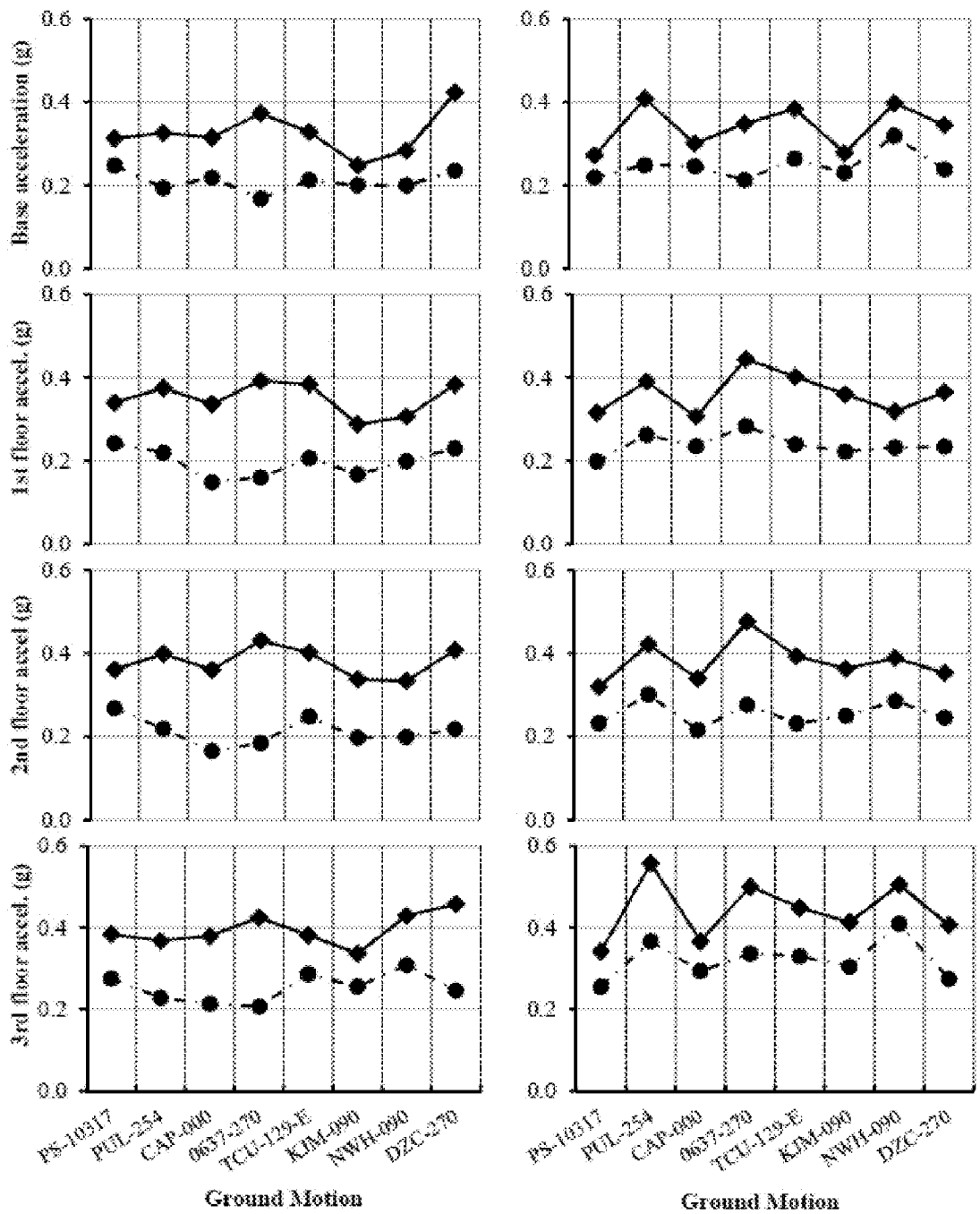
FIG. 8 shows graphs of peak acceleration of respective platforms of a model structure tested with (dashed line) and without an exemplary negative stiffness device (solid line) in two different configurations.
Figure 9:
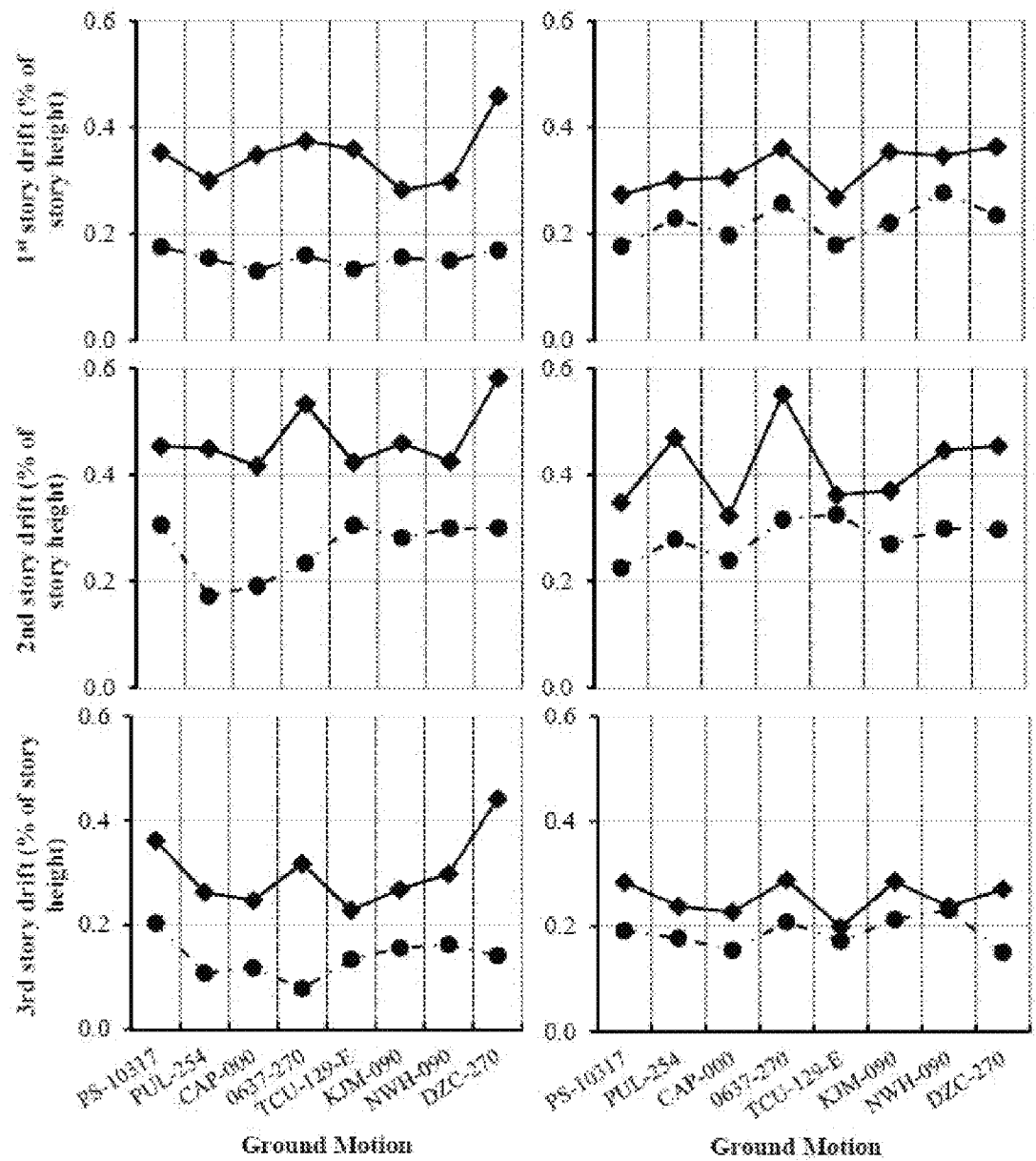
FIG. 9 shows graphs of peak inter-story drift or relative displacement for each of a model structure's stories tested with and without an exemplary negative stiffness device in two different configurations.
Figure 10:
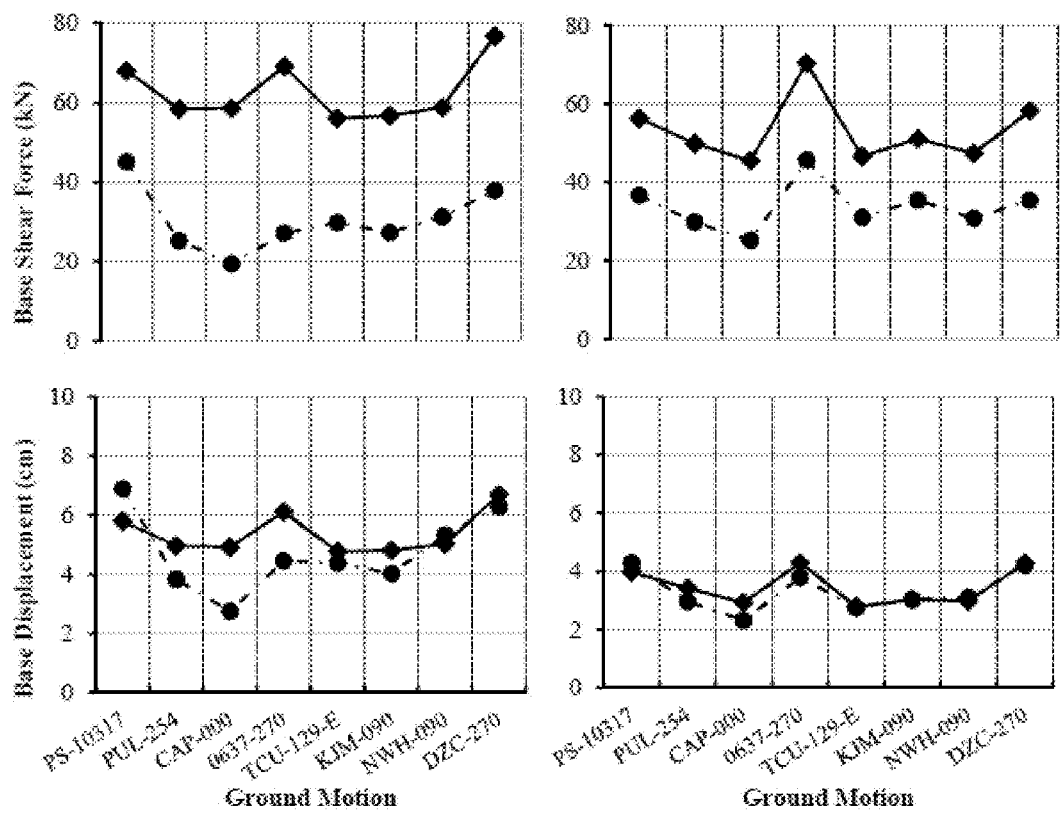
FIG. 10 shows graphs of peak shear force transmitted between the model ground (shake table) and graphs of peak displacement of the model structure tested with and without an exemplary negative stiffness device in two different configurations.

FIGS. 8, 9, and 10 are graphs showing the recorded peak response of the tested model structure. In each of these figures, the solid line represents the response of the model system without the negative stiffness devices 90 and the dashed line represents the response of the model system with the negative stiffness devices 90 installed. In FIGS. 8, 9, and 10, the left column of graphs depict the test results for the model system without viscous dampers, and the right column of graphs depict the test results for the model system with viscous dampers.

FIG. 8 graphs the peak acceleration of each platform (base and floors 1, 2 and 3) of the model structure. The peak accelerations are a measure of the inertial forces acting on the model structure and are responsible for damage to non-structural components such as suspended ceilings, sprinkler systems, anchored equipment, etc. A reduction of the peak acceleration at all levels is desirable.

FIG. 9 graphs the peak inter-story drift or relative displacement for each of the model structure's stories (stories 1, 2, and 3). The drift represents a measure of damage to the structural system (columns, braces, etc.) and to non-structural systems spanning between two floors such as walls, partitions, vertical pipes, etc. It is desirable to reduce the drift for all stories.

FIG. 10 graphs the peak shear force transmitted between the ground (shake table) and the model structure above. This force is the sum of all inertia forces acting on the structure and is the force for the design of the foundation. It is desirable to reduce the base shear force.

As shown in FIGS. 8, 9, and 10, the addition of the negative stiffness devices 90 resulted in substantial reduction of acceleration, inter-story drift, and base shear force, whereas the base displacement is slightly reduce or is unaffected. The addition of dampers had a marked effect on reducing the base displacement and worked synergistically with the devices 90.

Figure 11A:
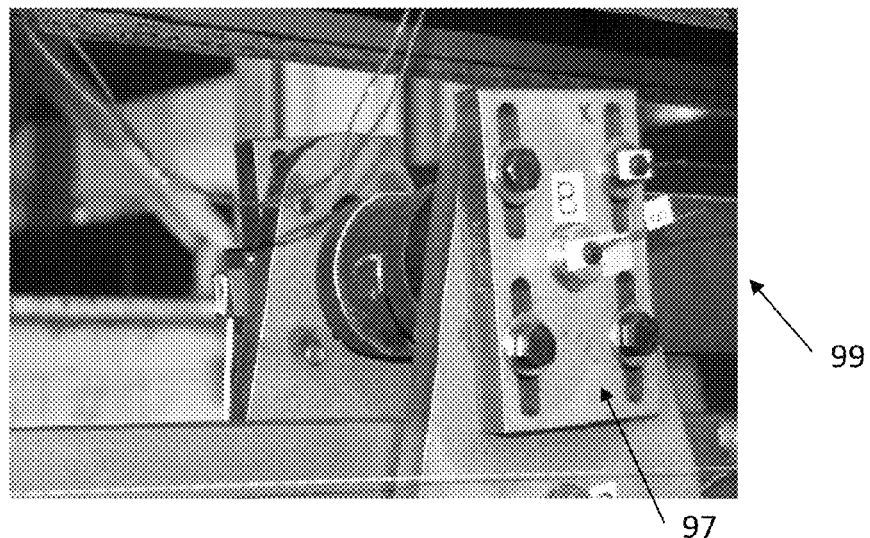
FIG. 11A shows an exemplary adjustable pivot member of a negative stiffness device in accordance to an embodiment of the present invention.
Figure 11B:
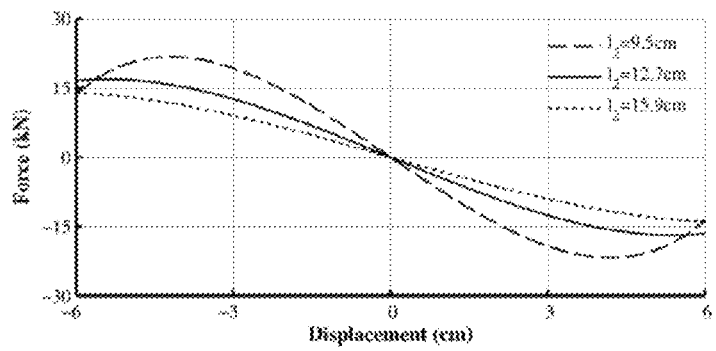
FIG. 11B is a force-displacement graph showing the effect of adjusting the adjustable pivot member shown in FIG. 11A.

In other embodiments of the present invention, the negative stiffness device 95 may be adjustable in the field. For example, FIG. 11A shows an adjustable pivot member 97 that can be adjusted to obtain a particular lever ratio, and therefore, different negative stiffness device force-displacement relations. FIG. 11B shows three force-displacement graphs showing the effect of adjusting the distance $l_2$ between the pivot point C of the pivot member 97 and the point in which the pivot member 97 and lever member 99 meet (see FIG. 1).

Figure 12A:
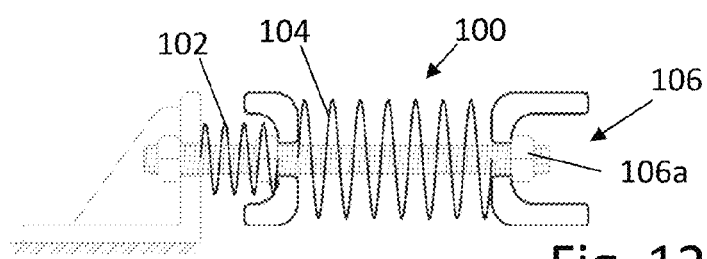
FIGS. 12A and 12B are diagrams of exemplary gap spring assemblies for use with negative stiffness devices according to embodiments of the present invention.
Figure 12B:
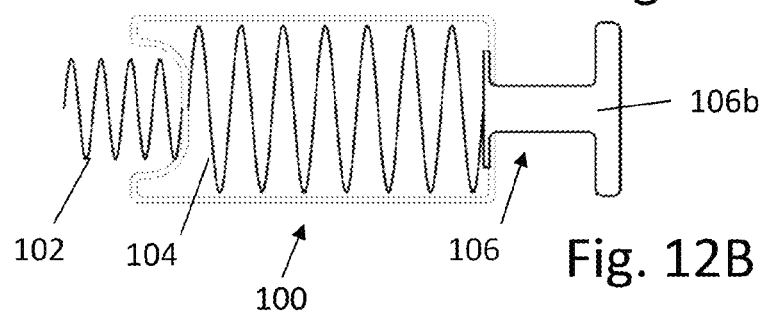

The present invention may also be equipped with an adjustable gap spring assembly. FIGS. 12A and 12B show embodiments where a gap spring assembly 100 has a first spring 102, a second spring 104, and an adjuster 106 that changes the predetermined lateral displacement of the gap spring assembly 100. Second spring 104 may be compressed to have a preload. In the embodiment shown in FIG. 12A, the preload of the second spring 104 is adjusted by tightening nut 106a. FIG. 12B shows a second embodiment of the gap spring assembly where a piston 102b is used to adjust the second spring 104. The piston can be provided, for example, with a threaded portion to adjust the preload of the second spring 104.

In another embodiment, the present invention is embodied as a method of protecting a structure from seismic activity. The method can include steps of providing at least one negative stiffness device. The negative stiffness device can include an anchor frame and a movement frame. The movement frame may be laterally translatable relative to the anchor frame. The anchor frame may have an extension portion extending in the direction of the movement frame. The movement frame may have an extension portion extending in the direction of the anchor frame. A linkage can be pivotably connected to the extension portion of the anchor frame. A compressed spring can have a first end attached to the extension portion of the movement frame and a second end attached to the linkage. The compressed spring is provided with a spring force. The at least one negative stiffness device can be configured to have a rest state where the compressed spring does not displace the movement frame and an engaged state where the compressed spring applies a lateral force to the movement frame such that the movement frame is displaced in a lateral direction of a seismic load. The linkage can be configured to amplify the spring force when the movement frame is laterally displaced to an amplification point. The at least one negative stiffness device can be installed at the base of a multi-story structure, by, for example, attaching the anchor frame to the floor and attaching the movement frame to the ceiling. In other embodiments a second of the at least one negative stiffness device is installed in a second story of the multi-story structure.

In a further embodiment, the compressed spring rotates about the first end of the compressed spring in the engaged state, such that the second end of the compressed spring may be displaced in an opposite lateral direction to the lateral direction of the seismic load. The linkage can include a pivot member and a lever member, the pivot member having a first end, a pivot point, and a second end, the lever member having a first end and a second end. The first end of the lever member can be pivotably attached to the extension portion of the movement frame and the second end of the lever member pivotably attached to the first end of the pivot member. The pivot point of the pivot member may be pivotably attached to the extension member of the anchor member and the second end of the pivot member may be pivotably attached to the compressed spring. The first end of the pivot member can be closer to the pivot point than the second end of the pivot member. Additionally, in the engaged stated, the first end of the lever member may be displaced by a first lateral distance, and the second end of the compressed spring may be displaced by a second lateral distance. The first lateral distance and the second lateral distance can be substantially equal.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A negative stiffness device for seismic protection of a structure, comprising:
   an anchor frame and a movement frame, the movement frame being laterally translatable relative to the anchor frame, the anchor frame having an extension portion extending toward the movement frame, the movement frame having an extension portion extending toward the anchor frame;
   a linkage pivotably connected to the extension portion of the anchor frame;
   a spring having a first end attached to the extension portion of the movement frame and a second end attached to the linkage, the spring having a spring force;
   wherein in a rest state, the spring is compressed to exert a preload force to the movement frame and does not displace the movement frame;
   wherein in an engaged state, the spring is configured to apply a lateral force to the movement frame such that the movement frame is displaced in a same lateral direction of a seismic load; and
   wherein the spring force is amplified by the linkage when the movement frame is laterally displaced to an amplification point.

2. The negative stiffness device of claim 1, wherein in the engaged state, the spring rotates about the first end of the spring such that the second end of the spring is displaced in an opposite lateral direction to the lateral direction of the seismic load.

3. The negative stiffness device of claim 1, wherein the linkage is configured to amplify the spring force such that at a peak amplification, the lateral force is about 20 to 100 times larger than the spring force.

4. The negatives stiffness device of claim 1, wherein the linkage includes a pivot member and a lever member, the pivot member having a first end, a pivot point, and a second end, the lever member having a first end and a second end;
   wherein the first end of the lever member is pivotably attached to the extension portion of the movement frame and the second end of the lever member pivotably attached to the first end of the pivot member;
   wherein the pivot point of the pivot member is pivotably attached to the extension member of the anchor member and the second end of the pivot member is pivotably attached to the spring.

5. The negative stiffness device of claim 4, wherein the first end of the pivot member is closer to the pivot point than the second end of the pivot member.

6. The negative stiffness device of claim 4, wherein in the engaged state, the first end of the lever member is displaced by a first lateral distance, and the second end of the spring is displaced by a second lateral distance, the first lateral distance and the second lateral distance being substantially equal.

7. The negative stiffness device of claim 1, further comprising at least one connecting member pivotably connecting the anchor frame to the movement frame.

8. The negative stiffness device of claim 7, wherein the at least one connecting member is two connecting members, the two connecting members being hingedly attached to the anchor frame and hingedly attached to the movement frame, the two connecting members being configured to limit a maximum vertical distance between the anchor frame and the movement frame.

9. The negative stiffness device of claim 1, further comprising a gap spring assembly configured to delay engagement of the spring by a predetermined lateral displacement.

10. The negative stiffness device of claim 9, wherein the gap spring assembly includes a pair of opposing springs, each opposing spring attached to the extension portion of the movement frame and the anchor frame.

11. The negative stiffness device of claim 9, wherein the gap spring assembly includes an adjustment mechanism configured to adjust the predetermined lateral displacement.

12. The negative stiffness device of claim 1, further comprising at least one damping device configured to reduce lateral translation of the movement frame.

13. The negatives stiffness device of claim 1, wherein the lateral force is applied by the spring to the linkage and to the extension portion of the movement frame.

14. The negative stiffness device of claim 1, wherein after an initial engaged state, the lateral force increases as the movement frame is displaced in the lateral direction to a peak engaged state;
   wherein after the peak engaged state, the lateral force decreases as the movement frame continues to be displaced in the lateral direction.

15. The negative stiffness device of claim 14, wherein lateral displacements between the initial engaged state and the peak engaged state the negative stiffness device exerts a negative stiffness, and in lateral displacements above the peak engaged state, the negative stiffness device exerts a positive stiffness.

16. The negative stiffness device of claim 1, wherein the extension portion of the anchor frame and the extension portion of the movement frame are chevron braces.

17. The negative stiffness device of claim 1, wherein the linkage includes a lever having a lever ratio, the lever configured to amplify the spring force according to the lever ratio; and
   wherein the lever ratio is adjustable.

18. The negative stiffness device of claim 1, wherein the spring force is amplified by any lateral displacement of the movement frame.

19. The negative stiffness device of claim 1, wherein the amplification point is a range of lateral displacement of the movement frame.

20. The negative stiffness device of claim 1, wherein the spring force is amplified when the negative stiffness device is in the engaged state.

* * * * *

UNITED STATES PATENT AND TRADEMARK OFFICE
CERTIFICATE OF CORRECTION

| | | |
|---|---|---|
| PATENT NO. | : 8,857,110 B2 | Page 1 of 1 |
| APPLICATION NO. | : 13/673257 | |
| DATED | : October 14, 2014 | |
| INVENTOR(S) | : Constantinou et al. | |

It is certified that error appears in the above-identified patent and that said Letters Patent is hereby corrected as shown below:

In the Specification

Column 1, line 11 should read:

--STATEMENT AS TO FEDERALLY SPONSORED RESEARCH

This invention was made with government support under National Science Foundation Contract No. 0830391 awarded by the National Science Foundation. The government has certain rights in the invention.--

Signed and Sealed this
Twenty-eighth Day of April, 2015

Michelle K. Lee
*Director of the United States Patent and Trademark Office*